United States Patent
Cui

(10) Patent No.: US 12,443,410 B2
(45) Date of Patent: Oct. 14, 2025

(54) DECODING METHOD OF SIMULTANEOUSLY MULTI-THREADING PROCESSOR, PROCESSOR, AND CHIP

(71) Applicant: HYGON INFORMATION TECHNOLOGY CO., LTD., Tianjin (CN)

(72) Inventor: Zehan Cui, Tianjin (CN)

(73) Assignee: HYGON INFORMATION TECHNOLOGY CO., LTD. (CN)

( * ) Notice: Subject to any disclaimer, the term of this patent is extended or adjusted under 35 U.S.C. 154(b) by 0 days.

(21) Appl. No.: 18/833,997

(22) PCT Filed: Sep. 13, 2023

(86) PCT No.: PCT/CN2023/118573
§ 371 (c)(1),
(2) Date: Jul. 29, 2024

(87) PCT Pub. No.: WO2024/093541
PCT Pub. Date: May 10, 2024

(65) Prior Publication Data
US 2025/0123845 A1  Apr. 17, 2025

(30) Foreign Application Priority Data
Oct. 31, 2022  (CN) .......................... 202211348787.1

(51) Int. Cl.
*G06F 9/30* (2018.01)
*G06F 9/38* (2018.01)

(52) U.S. Cl.
CPC ........ *G06F 9/3814* (2013.01); *G06F 9/30145* (2013.01); *G06F 9/3818* (2013.01);
(Continued)

(58) Field of Classification Search
CPC .. G06F 9/3814; G06F 9/30145; G06F 9/3818; G06F 9/3822; G06F 9/3851; G06F 9/3836
See application file for complete search history.

(56) References Cited

U.S. PATENT DOCUMENTS 6,931,639 B1 * 8/2005 Eickemeyer .......... G06F 9/3814
712/228
8,458,709 B2 * 6/2013 Armstrong .......... G06F 9/30181
718/100
(Continued)

FOREIGN PATENT DOCUMENTS

| CN | 104572016 A | 4/2015 |
|---|---|---|
| CN | 106406814 A | 2/2017 |

(Continued)

OTHER PUBLICATIONS

Extended European Search Report for Application No. 23884473.2, dated Apr. 29, 2025, 8 pages.

*Primary Examiner* — Corey S Faherty
(74) *Attorney, Agent, or Firm* — Fox Rothschild LLP

(57) ABSTRACT

A decoding method of a simultaneously multi-threading processor, a processor, and a chip are provided. The method includes: fetching an instruction stream according to an instruction fetching request; segmenting the instruction stream which is fetched in response to the simultaneously multi-threading processor being in a single-threaded mode; allocating the instructions at split positions as boundaries of switching instructions queues, wherein the plurality of target instruction queues comprise instruction queues corresponding to active threads and instruction queues corresponding to inactive threads; and decoding the instructions in the plurality of target instruction queues by using a plurality of decoder groups to obtain micro-ops obtained after decoding by the decoder groups. The embodiments of the present
(Continued)

disclosure can improve the decoding efficiency of a multi-thread processor while being compatible with multiple thread modes.

20 Claims, 9 Drawing Sheets

(52) U.S. Cl.
CPC .......... *G06F 9/3822* (2013.01); *G06F 9/3851* (2013.01); *G06F 9/3836* (2013.01)

(56) References Cited

U.S. PATENT DOCUMENTS

| | | |
|---|---|---|
| 9,389,869 B2 | 7/2016 | Tran |
| 9,417,920 B2 | 8/2016 | Tran |
| 2008/0313425 A1* | 12/2008 | Le .................. G06F 9/30105 712/23 |
| 2011/0276783 A1* | 11/2011 | Golla .................. G06F 9/384 712/200 |
| 2019/0163485 A1* | 5/2019 | Karve ............... G06F 9/30189 |
| 2022/0035636 A1* | 2/2022 | Schwarz ............ G06F 9/3856 |
| 2022/0100519 A1 | 3/2022 | Cohen et al. |

FOREIGN PATENT DOCUMENTS

| | | |
|---|---|---|
| CN | 111679857 A | 9/2020 |
| CN | 114090077 A | 2/2022 |
| CN | 115629807 A | 1/2023 |
| DE | 60035480 T2 | 4/2008 |
| EP | 2192483 A1 | 6/2010 |

\* cited by examiner

DECODING METHOD OF SIMULTANEOUSLY MULTI-THREADING PROCESSOR, PROCESSOR, AND CHIP

RELATED APPLICATIONS AND CLAIM OF PRIORITY

The present application is a national phase entry of PCT/CN2023/118573 filed Sep. 13, 2023, which claims priority of Chinese Patent Application No. 202211348787.1, filed on Oct. 31, 2022, the disclosures of which are hereby incorporated herein by reference herein in their entirety.

TECHNICAL FIELD

Embodiments of the present disclosure relate to a decoding method of a simultaneously multi-threading processor, a processor, a chip, and an electronic device.

BACKGROUND

Simultaneously multi-threading processor means that multiple threads on the same processor are executed simultaneously and share the computing and memory access resources on the processor, thereby maximizing the multi-issue and out-of-order processing of the processor. The simultaneously multi-threading processor has downward compatibility in situations with multiple thread modes. For example, a four-threaded (SMT4) processor supports four-threaded (SMT4) mode, two-threaded (SMT2) mode, and single-threaded (ST) mode, and SMT4 processor supports switching between SMT4 mode, SMT2 mode, and ST mode.

In the simultaneously multi-threading processor, instructions need to go through processes such as instruction fetching, decoding, execution, etc. Decoding is the process in which the decoder parses and compiles the fetched instructions to obtain micro-ops (micro instructions). In order to improve decoding performance, multiple decoder groups can be set up in the simultaneously multi-threading processor to decode multiple instructions. However, when the simultaneously multi-threading processor is compatible with multiple thread modes, how to improve the decoding efficiency of the simultaneously multi-threading processor becomes a problem.

SUMMARY

In view of this, embodiments of the present disclosure provide a decoding method of a simultaneously multi-threading processor, which can improve the decoding efficiency of the simultaneously multi-threading processor while being compatible with multiple thread modes.

In order to achieve the above objectives, the embodiments of the present disclosure provide the following technical solutions.

In the first aspect, the present disclosure provides a decoding method of a simultaneously multi-threading processor, and the method comprises:
fetching an instruction stream according to an instruction fetching request;
segmenting the instruction stream which is fetched in response to the simultaneously multi-threading processor being in a single-threaded mode;
allocating the instruction stream which is segmented to multiple target instruction queues by using an instruction at a segmentation position as a boundary of switching instruction queues, wherein the multiple target instruction queues comprise an instruction queue corresponding to an active thread and one or more instruction queues corresponding to one or more inactive threads; and
decoding instructions in the multiple target instruction queues by using multiple decoder groups, so as to obtain micro-ops decoded by respective decoder groups, wherein one decoder group decodes instructions in one or more corresponding target instruction queues, and in the single-threaded mode, one decoder group corresponds to at least one target instruction queue.

In the second aspect, the present disclosure provides a simultaneously multi-threading processor, which comprises:
an instruction cache, used for fetching an instruction stream according to an instruction fetching request;
an instruction demultiplexer, used for segmenting the instruction stream which is fetched in response to the simultaneously multi-threading processor being in a single-threaded mode, and allocating the instruction stream which is segmented to multiple target instruction queues by using an instruction at a segmentation position as a boundary of switching instruction queues, wherein the multiple target instruction queues comprise an instruction queue corresponding to an active thread and one or more instruction queues corresponding to one or more inactive threads; and
multiple decoder groups, used for decoding instructions in the multiple target instruction queues by using the multiple decoder groups, so as to obtain micro-ops decoded by respective decoder groups, wherein one decoder group decodes instructions in one or more corresponding target instruction queues, and in the single-threaded mode, one decoder group corresponds to at least one target instruction queue.

In the third aspect, the present disclosure provides a chip, which comprises the simultaneously multi-threading processor described above.

In the fourth aspect, the present disclosure provides an electronic device, which comprises the chip described above.

The decoding method of the simultaneously multi-threading processor provided by the embodiments of the present disclosure is able to fetch an instruction stream according to an instruction fetching request, and then segment the fetched instruction stream in response to the simultaneously multi-threading processor being in a single-threaded mode, and allocate the segmented instruction stream to multiple target instruction queues by using an instruction at a segmentation position as a boundary of switching instruction queues, where the multiple target instruction queues comprise an instruction queue corresponding to an active thread and one or more instruction queues corresponding to one or more inactive threads, and finally, decode instructions in the multiple target instruction queues by using multiple decoder groups, so as to obtain micro-ops decoded by respective decoder groups. The embodiments of the present disclosure set up multiple decoder groups in a simultaneously multi-threading processor, and enable each decoder group to correspond to one or more threads in the simultaneously multi-threading processor and perform decoding operations, so as to achieve that multiple decoder groups can process in parallel when instructions in the simultaneously multi-threading processor need to be processed, thereby improving the throughput of the decoding process and improving the decoding efficiency of the simultaneously multi-threading process. Further, in the embodiments of the present disclosure, the simultaneously multi-threading processor supports out-of-order decoding of instructions and integrates the resources of multiple threads in the simultaneously multi-threading processor as much as possible, so as to effectively integrate the resources of the simultaneously multi-threading processor while improving the decoding efficiency of the simultaneously multi-threading processor, and avoid waste of resources in the simultaneously multi-threading processor.

BRIEF DESCRIPTION OF THE DRAWINGS

In order to explain the embodiments of the present disclosure more clearly, the following will briefly introduce the drawings needed to be used in the embodiments. Obviously, the drawings in the following description are only embodiments of the present disclosure, for those of ordinary skill in the art, other drawings can be obtained based on the provided drawings without any creative effort.

DETAILED DESCRIPTION

Technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without making creative efforts fall within the scope of protection of this disclosure.

Instructions are commands that control a computer to perform operations, also called machine instructions. The function of instructions is to coordinate the working relationship between various hardware components, which reflects the basic functions of the computer and is the smallest functional unit for computer running. When the computer executes a certain operation command, the processor needs to process the instruction and convert it into machine language that can be recognized by the machine. In a processor, pipeline technology is generally used to implement instruction processing.

In the processor's pipeline operation, instructions need to go through processes such as instruction fetching, instruction decoding, execution, etc. Instruction fetching is to fetch instructions corresponding to program running from the processor's cache or main memory; instruction decoding is to decode the fetched instructions to determine the operation code and/or address code of the instruction, etc.; execution is to execute the instruction operation based on the obtained operation code and/or address code, etc., so as to implement program running. Since there is possibility of existing branch instructions which may change program flow in the instructions, in order to solve the pipeline delay caused by the processor waiting for the execution result of the branch instruction to determine the next instruction fetching when processing the branch instructions, the front end of the pipeline for processing instructions in the processor can also be provided with a branch prediction unit to implement branch prediction of instructions.

Figure 1A:
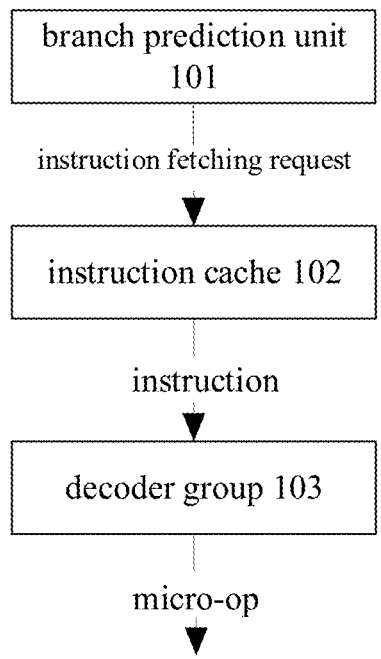
FIG. 1A is a schematic diagram of a single-threaded processor.

FIG. 1A exemplarily illustrates the architectural block diagram of a single-threaded processor, where the single thread means that there is only one single sequential control flow in the decoding process of one processor. The processor includes: a branch prediction unit 101, an instruction cache 102, and a decoder group 103.

The branch prediction unit 101 is a digital circuit that can perform branch prediction on the instructions and generate an instruction fetching request based on the branch prediction result. The branch prediction result includes whether the current instruction is a branch instruction, the branch result of the branch instruction (direction, address, target address, etc.), or the like. In an implementation, the branch prediction unit can perform branch prediction of the instruction based on historical execution information and results of the branch instruction, thereby obtaining the range of instruction fetching address and generating an instruction fetching request. The instruction fetching request generated by the branch prediction unit includes fetching addresses of several instructions and is used to fetch corresponding instructions from the instruction cache 102.

Instructions are stored in the instruction cache 102. According to the instruction fetching request generated by the branch prediction unit, multiple instructions to be decoded can be fetched from the instruction cache 102. Optionally, the instruction cache 102 may be a cache portion located in the first-level cache of the processor for storing instructions.

The decoder group 103 is capable of parsing and compiling instructions. Through the decoding operation executed by the decoder group, decoded instruction can be obtained. The decoded instruction can be machine-executable operation information obtained by interpreting the instruction, such as a machine-executable uop formed by a control field, that is, the decoder can decode the instruction to obtain micro-ops.

Figure 1B:
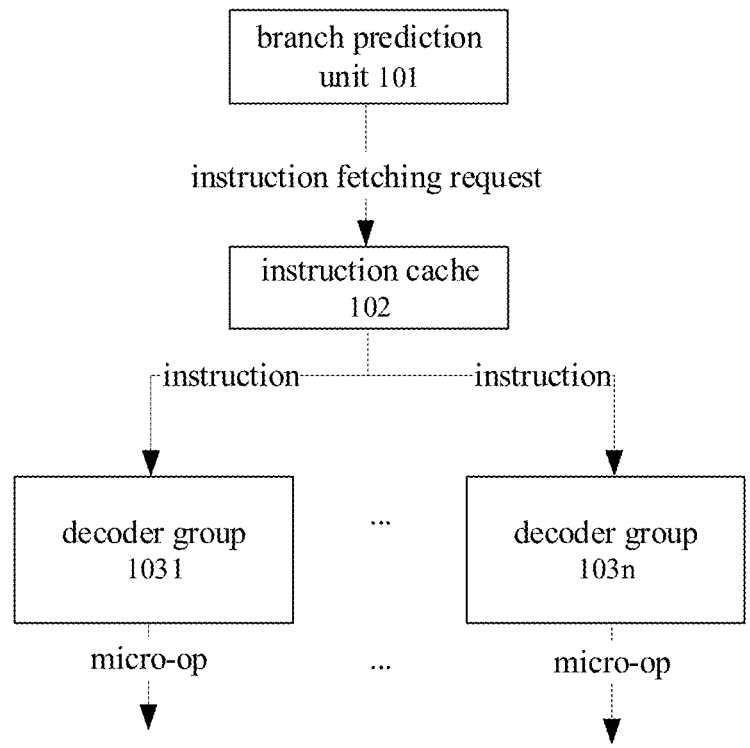
FIG. 1B is another schematic diagram of a single-threaded processor.

The processor architecture illustrated in FIG. 1A uses a single decoder group to decode instructions. This processor is limited by the throughput of the decoder group, and it is difficult to effectively improve the decoding efficiency of instructions. Based on this, a processor that uses multiple decoder groups to decode instructions in parallel emerges. FIG. 1B exemplarily illustrates another architectural block diagram of a processor. Combined with FIG. 1A and FIG. 1B, the processor illustrated in FIG. 1B is provided with multiple decoder groups 1031 to 103n. The specific value of n can be determined according to the specific design of the processor, and is not limited by the embodiments of the present disclosure. Based on the multiple decoder groups 1031 to 103n set by the processor, the instruction stream fetched by the instruction cache 102 based on the instruction fetching request can be allocated to multiple decoder groups for decoding, so that the multiple decoder groups perform out-of-order decoding on instructions, and output the decoded micro-op, respectively, which can improve instruction decoding efficiency.

In an example, the multiple decoder groups may be two decoder groups, such as decoder group 1031 and decoder group 1032, respectively. The decoder group 1031 and the decoder group 1032 can alternately fetch instructions to be decoded from the instruction cache without following the order of instructions, and perform decoding operations, thereby realizing out-of-order decoding of instructions. It should be noted that in actual applications, the processor may be provided with two or more decoder groups as needed. For ease of understanding, the embodiments of the present disclosure only illustrate examples of two decoder groups.

Figure 1C:
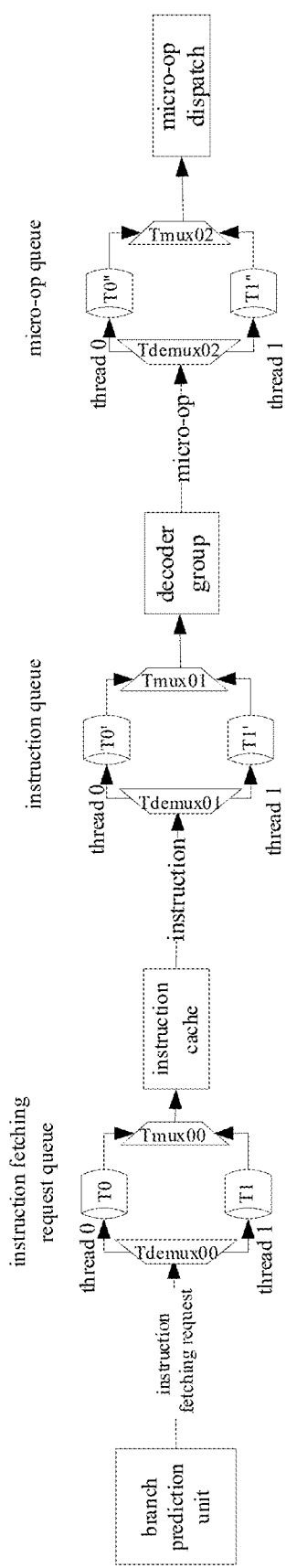
FIG. 1C is an architectural block diagram of the SMT2 processor in SMT2 mode.

However, the processor illustrated in FIG. 1A and FIG. 1B is a processor with singled-thread. With the continuous development of processor technology, high-performance processors with simultaneous multi-threaded functions, that is, simultaneously multi-threading process, is proposed. In the simultaneously multi-threading processor, one processor can have multiple threads at the same time to perform the decoding operation of the processor. Moreover, multiple threads can execute at the same time and share the execution resources of the processor, which can maximize the parallel execution of instructions. The simultaneously multi-threading processor has downward compatibility features. For example, the simultaneously multi-threading processor supports multiple processor modes. For example, four-threaded (SMT4) processors support four-threaded (SMT4) mode, two-threaded (SMT2) mode, and single-threaded (ST) mode, and the SMT4 processor supports switching between any two of SMT4 mode, SMT2 mode, and ST mode. The two-thread (SMT2) processor supports the two-thread (SMT2) mode and the single-thread (ST) mode, and the SMT2 processor supports switching between SMT2 mode and ST mode. Taking the SMT2 processor as an example, FIG. 1C is an architectural block diagram of the SMT2 processor in SMT2 mode. As illustrated in FIG. 1C, the branch prediction unit is responsible for generating instruction fetching request, the instruction cache is responsible for executing the instruction fetching request and fetching instructions from the cache, the decoder group is responsible for decoding the instructions to obtain micro-ops, and micro-op dispatch is used to dispatch the decoded micro-ops, so as to realize the execution and memory access of the instructions. There are usually buffer queues between the functional units of the SMT2 processor (i.e., the branch prediction unit, the instruction cache, the decoder group, and the micro-op dispatch). From front to back, there are instruction fetching request queue, instruction queue, and micro-op queue.

It should be noted that the amount of buffer queues between functional units of a simultaneously multi-threading processor depends on the amount of threads supported by the simultaneously multi-threading processor. Each thread has its own independent buffer queue. The simultaneously multi-threading processor can include at least a four-thread processor and a two-thread processor. In other possible implementations, it can also be an eight-thread processor, which is not specifically limited here.

In the simultaneously multi-threading processor, each functional unit (i.e., the branch prediction unit, the instruction cache, the decoder group, and the micro-op dispatch) performs election operation from the buffer queues of multiple threads through a multiplexer (Tmux). In each clock cycle of the simultaneously multi-threading processor, the input of one thread is selected to perform the corresponding function. The demultiplexer (Tdemux) serves as the output of the functional unit and determines the instruction queue to be written into the corresponding thread based on the currently executing thread ID (thread identity). Referring to FIG. 1C, the branch prediction unit generates an instruction fetching request. Tdemux00 allocates the instruction fetching request to the instruction fetching request queue T0 of the corresponding thread ID based on the currently executing thread ID, and then Tmux00 transfers the instructions in the instruction fetching request queue of thread 0 to the instruction cache. Tdemux01 writes the instruction to be decoded into the instruction queue T0' corresponding to thread 0 according to the thread ID of the instruction to be decoded output by the instruction cache, and Tmux01 hands the instruction to be decoded to the decoder groups to perform decoding operations, and then Tdemux02 writes the decoded micro-op into the micro-op queue T0" corresponding to thread 0. Tmux02 selects the micro-op queue, and reads the micro-op in the corresponding micro-op queue, and performs micro-op dispatch on the read micro-ops. In SMT2, the operation of thread 1 is the same as that of thread 0 and can be executed by reference.

It should be noted that in SMT2, when thread 0) and thread 1 are both active threads, Tdemux01 selects to write the instruction into the instruction queue of the thread corresponding to the thread ID according to the thread ID of the instruction output by the instruction cache; Tmux01 selects the instruction queue according to the thread ID, fetches the instructions to be decoded in the instruction queue, and outputs them to the decoder group to perform decoding operations; the decoded micro-ops are handed to Tdemux02, and Tdemux02 selects the micro-op queue of the thread corresponding to the thread ID in the micro-op queues according to the thread ID, and write the micro-op into the corresponding micro-op queue; Tmux02 selects the micro-op queue corresponding to the thread ID according to the thread ID before performing micro-op dispatch, and outputs the micro-op in the corresponding micro-op queue into the micro-op dispatch unit.

In an optional implementation in the embodiments of the present disclosure, Tdemux01 can determine multiple target instruction queues corresponding to the thread ID based on the thread ID of the instruction output by the instruction cache, and allocate the fetched instruction stream to the corresponding multiple target instruction queues.

Figure 1D:
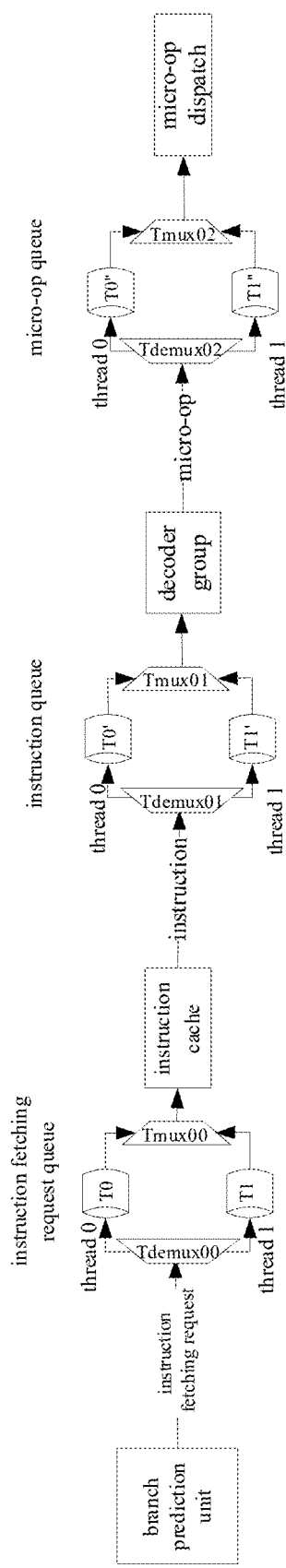
FIG. 1D is an architectural block diagram of the SMT2 processor in ST mode.

Based on the downward compatibility feature of the simultaneously multi-threading processor, when the simultaneously multi-threading processor switches from multi-threaded mode to single-threaded mode, multiple threads in the simultaneously multi-threading processor can have inactive threads. Taking SMT2 as an example, the decoding process of switching from SMT2 mode to ST mode is explained. FIG. 1D is an architectural block diagram of the SMT2 processor in ST mode.

As illustrated in FIG. 1D, in the ST mode of the SMT2 processor, thread 0 is an active thread and thread 1 is an inactive thread. Specifically, when thread 1 is inactive, its corresponding instruction fetching request queue T1 (the grey part in the figure) no longer accepts Tdemux00 writing instruction fetching requests, the instruction queue T1' (the grey part in the figure) no longer accepts Tdemux01 writing instructions, micro-op queue T1" (the grey part in the figure) no longer accepts Tdemux02 writing micro-ops. Similarly, Tmux00 no longer selects the instruction fetching request queue T1 corresponding to thread 1, Tmux00 no longer selects instruction queue T1' in thread 1, and Tmux00 no longer selects the micro-op queue T1" in thread 1. It can be seen that when SMT2 is downward compatible with single-threaded mode, T1 queue corresponding to thread 1 of SMT2 (i.e., the instruction fetching request queue T1, the instruction queue T1', and the micro-op queue T1") is idle, resulting in the waste of queue space resources in SMT2, that is, when there are inactive threads in a simultaneously multi-threading processor, the simultaneously multi-threading processor cannot fully utilize the space resources of the inactive threads.

In another optional implementation, T1 queue corresponding to the inactive thread 1 of SMT2 can also be merged into T0 queue corresponding to thread 0 (i.e., the instruction fetching request queue T0, the instruction queue T0', and the micro-op queue T0") for use, which can make the depth of the T0 queue corresponding to thread 0 doubled. However, in this case, merging the resources of inactive threads can only increase the depth of active threads. In the case of a single decoder group, the decoding efficiency of the simultaneously multi-threading processor is not high.

Based on the above, whether there are space resources of inactive threads in a simultaneously multi-threading processor, or under the premise that inactive threads are merged with active threads, only single decoder group is adopted and decoding operations can only be performed in the order in which the instructions to be decoded are written by the instruction queue selected by Tmux, currently, the decoding efficiency of simultaneously multi-threading processor is not high.

Based on the above, the embodiments of the present disclosure propose an improved structure of a simultaneously multi-threading processor. Multiple decoder groups are provided in the simultaneously multi-threading processor, and each decoder group can correspond to one or more threads in the simultaneously multi-threading processor. Decoding operations are performed by the multiple decoder groups, so that when instructions in the simultaneously multi-threading processor need to be processed, multiple decoder groups can be used for parallel processing to improve the throughput of the decoding process, thereby improving the decoding efficiency of the simultaneously multi-threading processor. Furthermore, when the simultaneously multi-threading processor is in the single-threaded mode and decodes instructions out of order, the resources of multiple threads in the simultaneously multi-threading processor can also be integrated to improve the decoding efficiency of the simultaneously multi-threading processor when integrate the resources of the simultaneously multi-threading processor, so as to avoid resources wasting in the simultaneously multi-threading processor. That is to say, the embodiments of the present disclosure can use multiple decoded groups in multi-threaded mode to improve decoding throughput; in single-threaded mode, multiple decoded groups are used and perform out-of-order decoding, so as to improve decoding throughput.

Figure 2:
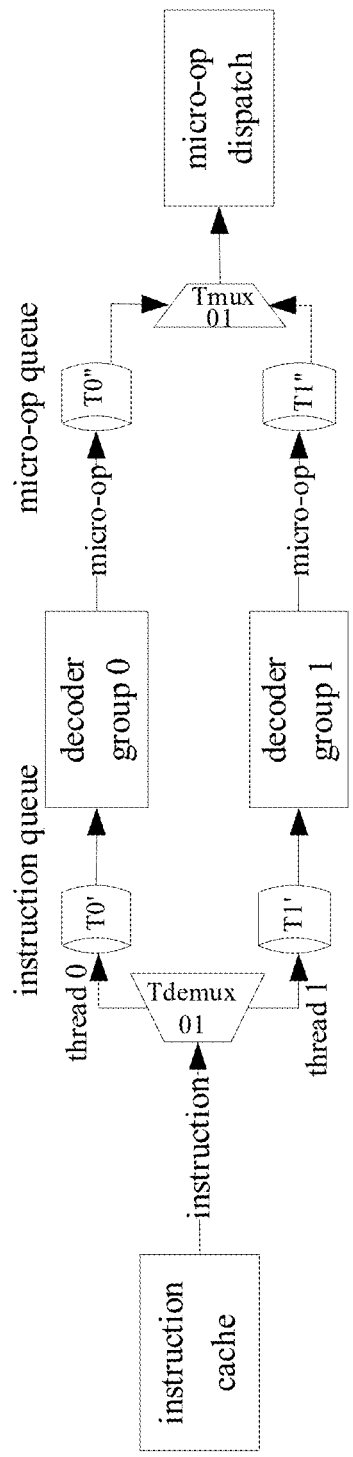
FIG. 2 is a structural schematic diagram of a simultaneously multi-threading processor provided by the embodiments of the present disclosure.

Based on the above, the SMT2 processor is continually taken as an example for explanation. FIG. 2 is a schematic structural diagram of a simultaneously multi-threading processor (SMT2) provided by embodiments of the present disclosure. As illustrated in FIG. 2, the SMT2 processor includes: an instruction cache, multiple decoder groups (decoder group 0) and decoder group 1, respectively), and micro-op dispatch. In this embodiment, one decoder group corresponds to one instruction queue and one micro-op queue. When the SMT2 processor is in SMT2 mode, the instruction cache fetches the instruction based on the instruction fetching request generated by the branch prediction unit. Tdemux01 adapts the instruction to the instruction queue corresponding to the thread ID, and then the decoder group matching with the thread ID is used for decoding. First, the decoding process of thread 0) is explained. Tdemux01 allocates instructions to the instruction queue T0' according to the thread ID 0, and then the instructions in the instruction queue T0' are transferred to the decoder group 0 for decoding, and the obtained micro-ops are written into the micro-op queue T0", so that Tmux01 can perform micro-op transmission on the micro-op queue according to the thread ID. Similarly, the decoding process on thread 1 is below. Tdemux01 allocates the instructions to the instruction queue T1' according to the thread ID 1, and then the instructions in the instruction queue T1' are transferred to the decoder group 1 for decoding, and the obtained micro-ops are written into the micro-op queue T1", so that Tmux01 can implement micro-op dispatch and transmission according to the thread ID 1. Optionally, when Tmux01 needs to dispatch instructions in the micro-op queue T0" and instructions in the micro-op queue T1", micro-ops in different micro-op queues can be dispatched according to different thread IDs.

When the SMT2 processor is in ST mode, at this time, only thread 0 or only thread 1 is active. The instruction cache fetches the instruction stream based on the instruction fetching request generated by the branch prediction unit and sends it to Tdemux01. Tdemux01 segments the instruction stream at this time, so that the segmented instruction stream can be allocated to the instruction queue corresponding to thread 0 and thread 1 of the SMT2 processor (only one of thread 0 or thread 1 is active), and then two decoder groups of two threads are used to perform parallel decoding, so that in the ST mode of the SMT2 processor, two instruction queues and two decoder groups are used, and the micro-ops decoded by the two decoder groups are stored in the corresponding micro-op queue. When the SMT2 processor is in ST mode, the out-of-order decoding operation of instructions in ST mode can be realized based on the segmentation operation of Tdemux01 on the instruction stream. Moreover, in the ST mode of the embodiments of the present disclosure, the queue resources of inactive threads can be merged to avoid resource waste in the simultaneously multi-threading processor, which can effectively improve the decoding performance of the processor. It can be seen that the embodiments of the present disclosure can utilize multiple decoder groups to perform out-of-order decoding in single-thread mode, thereby improving decoding throughput.

Figure 3:
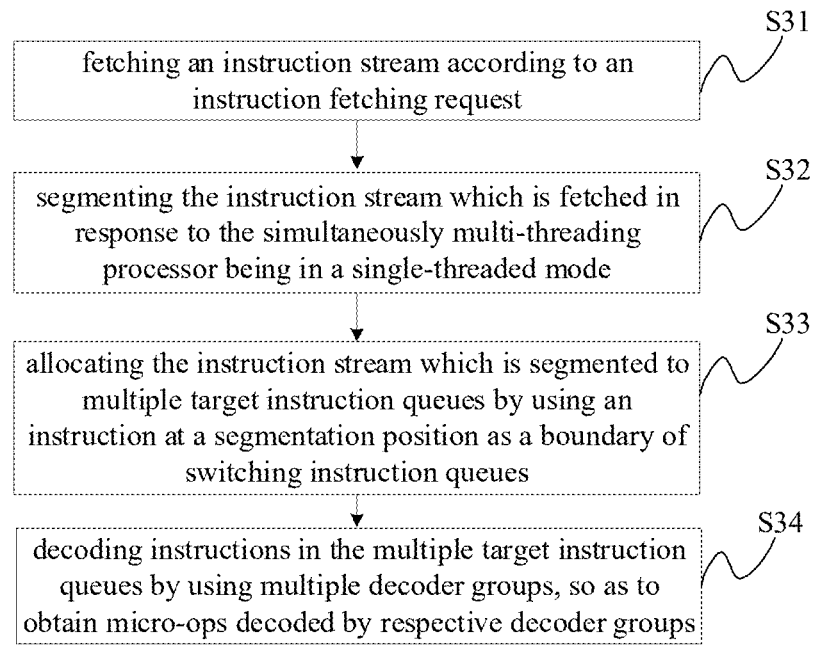
FIG. 3 an optional flow chart of a decoding method executed by a simultaneously multi-threading processor in the embodiments of the present disclosure.

Under the architecture of the simultaneously multi-threading processor, FIG. 3 is an optional flowchart of a decoding method executed by a simultaneously multi-threading processor in an embodiment of the present disclosure. Referring to FIG. 3, the decoding method may specifically include following operations.

Step S31, fetching an instruction stream according to an instruction fetching request.

The instruction fetching request is used to indicate fetching the instruction stream from the instruction cache.

Step S32, segmenting the instruction stream which is fetched in response to the simultaneously multi-threading processor being in a single-threaded mode.

Since simultaneously multi-threading processor has downward compatibility modes, there are cases where simultaneously multi-threading processor is in the single-threaded mode. When the simultaneously multi-threading processor is in the single-threaded mode and needs to perform decoding, in order to effectively utilize the multiple instruction queues of the simultaneously multi-threading processor, the instruction stream fetched from the instruction cache needs to be segmented.

Step S33, allocating the instruction stream which is segmented to multiple target instruction queues by using the instruction at a segmentation position as boundary of switching instruction queues, where the multiple target instruction queues comprise an instruction queue corresponding to an active thread and one or more instruction queues corresponding to one or more inactive threads.

The target instruction queue is used to store instructions to be decoded. Furthermore, the amount of the multiple target instruction queues is less than or equal to the amount of instruction queues in the simultaneously multi-threading processor.

In an embodiment, when the amount of the multiple target instruction queues is less than the amount of the threads of the simultaneously multi-threading processor, the instruction queue corresponding to an active thread and the instruction queue corresponding to another active thread which correspond to the same one decoder group can be merged in pairs to serve as the target instruction queue; or the instruction queue corresponding to the active thread and the instruction queue corresponding to the inactive thread which correspond to the same one decoder group can be merged in pairs to serve as the target instruction queue; or the instruction queues corresponding to the active threads which correspond to the same one decoder group serve as the target instruction queue, and the instruction queues corresponding to the inactive threads are discarded; or the instruction queues corresponding to the inactive threads which correspond to the same one decoder group serve as the target instruction queue, and the instruction queues corresponding to the active threads are discarded.

Further, in some other embodiments, when the amount of the multiple target instruction queues is equal to the amount of the threads of the simultaneously multi-threading processor, the instruction queues corresponding to different threads of the simultaneously multi-threading processor are the multiple target instruction queues.

It can be understood that the instruction fetching request generated by the branch prediction unit contains the instruction address of the branch prediction jump, so that the instruction stream fetched by the instruction cache according to the branch prediction unit contains a branch jump instruction, the branch jump instruction is an instruction with an instruction end, the instruction end of the branch jump instruction in the instruction stream can be used as the segmentation position of the instruction stream to segment the instruction stream into multiple instruction groups, so that the instructions at the segmentation positions can be used as boundary to segment the instruction queue, and the segmented instruction groups are allocated to multiple instruction queues. In the embodiments of the present disclosure, when the simultaneously multi-threading processor is in the single-threaded mode, Tdemux can identify the segmentation position in the instruction stream fetched by the instruction cache, and use the segmentation position as the instruction boundary information of the instruction stream, so as to realize segmentation of instruction stream by Tdemux. It should be noted that the instruction boundary information in the embodiments of the present disclosure is not limited to the segmentation position indicated by the branch jump instruction, other mechanisms can also be implemented. As long as it is guaranteed to perform segmentation at the effective boundary of the instruction stream, it can be used as the instruction boundary information, the embodiments of the present disclosure do not limit this.

In some embodiments, since the instruction boundary information indicates the instruction position (such as the instruction end address) where the instruction can be segmented, after Tdemux obtains the instruction stream, it can use the instruction at the segmentation position as the boundary to switch the instruction queue, and segment the instruction stream and dispatch the segmented instruction stream to multiple decoder groups for parallel decoding.

As an optional implementation of segmenting the instruction stream, Tdemux uses the instruction position indicated by the instruction boundary information as the boundary to segment the instruction stream into instructions before segmentation position and instructions after segmentation position, thereby segmenting the instruction stream into multiple instruction streams. When Tdemux allocates the multiple instruction streams to corresponding instruction queues to perform decoding operations, the instructions before segmentation position can be allocated to the target instruction queue corresponding to a thread, and the instructions after segmentation position can be switched to a target instruction queue corresponding to another thread different from the previous thread, and other threads are allocated by analogy.

Continuing referring to FIG. 2, the SMT2 processor has two instruction queues corresponding to the two supported threads (thread T0 and thread T1), namely instruction queue T0' and instruction queue T1'. Instruction queue T0' corresponds to decoder group 0, instruction queue T1' corresponds to decoder group 1.

In some embodiments, when the SMT2 processor is in the single-threaded (ST) mode, only one thread is active at this time, and the active thread may be thread T0 or thread T1. For example, the SMT2 processor is in the ST mode. When thread T0 is active, thread T1 is inactive; when thread T0 is inactive, thread T1 is active. In the above two states, the instruction queue corresponding to the thread can both be used as the target instruction queue.

Further, taking that the SMT2 processor is in the single-threaded mode and only thread T0 is active as an example, the segmented instruction stream is sequentially allocated to the active instruction queue T0' corresponding to thread T0 and the inactive instruction queue T1' corresponding to thread T1, the instruction queue T0' corresponding to the active thread T0 and the instruction queue T1' corresponding to the inactive thread T1 are both used as the multiple target instruction queues in the embodiments of the present disclosure.

Step S34, decoding instructions in the multiple target instruction queues by using multiple decoder groups, so as to obtain micro-ops decoded by respective decoder groups, where one decoder group decodes instruction in one or more corresponding target instruction queues, and in the single-threaded mode, one decoder group corresponds to at least one target instruction queue.

Optionally, one decoder group corresponds to at least one target instruction queue. For this purpose, multiple decoder groups can be used to decode instructions in multiple target instruction queues in parallel, thereby obtaining multiple decoded micro-ops decoded by the decoder groups.

In the embodiments of the present disclosure, the simultaneously multi-threading processor is in the single-threaded mode, and can segment the fetched instruction stream, and dispatch the segmented instruction stream to multiple target instruction queues corresponding to the simultaneously multi-threading processor, and then use multiple decoder groups to process multiple target instruction queues in parallel, which improves the throughput of the decoding process, thereby improving the decoding performance of the simultaneously multi-threading processor.

In some embodiments, when the simultaneously multi-threading processor is in the single-threaded mode, the embodiments of the present disclosure disclose an optional implementation of segmenting the fetched instruction stream. Segmenting the instruction stream in the embodiment of the present disclosure may include: segmenting the instruction stream according to a segmentation position indicated by instruction boundary information for instruction segmenting. The instruction boundary information is carried in the instruction fetching request.

Instruction boundary information is used to indicate the instruction position where the instruction is segmented. When the simultaneously multi-threading processor is in the single-threaded mode, as illustrated in FIG. 2, Tdemux01 in the simultaneously multi-threading processor can segment the instruction fetched from the instruction cache according to the segmentation position indicated by the instruction boundary information.

In some embodiments, the instruction boundary information in embodiments of the present disclosure indicates the instruction end position of the branch jump instruction. There may be a branch instruction in an instruction stream, which can change the execution flow of the program or call a subroutine. The prediction of the branch instruction by the branch prediction unit can determine the fetch address of the next instruction of the branch instruction. When the instruction predicted by the branch prediction unit is a jump, the current fetch end address corresponding to the branch jump instruction in the instruction fetching request is used as the end address of the branch jump instruction, and the fetch start address of the next instruction is the fetch address where it jumps. It can be understood that the branch jump instruction is a complete instruction, and the instruction end position of the branch jump instruction can be used as a valid instruction boundary, that is, the instruction boundary information in the embodiments of the present disclosure.

Figure 4:
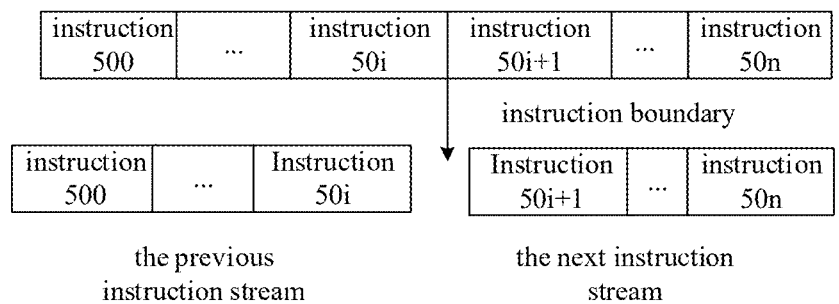
FIG. 4 is a flow chart for segmenting an instruction stream according to instruction boundary information provided by the embodiments of the present disclosure.

In order to facilitate understanding of the principle of segmenting the instruction stream based on the instruction position indicated by the instruction boundary information, a detailed introduction will be made in conjunction with FIG. 4. FIG. 4 illustrates a schematic diagram of segmenting the instruction stream according to instruction boundary information in the embodiments of the present application.

As illustrated in FIG. 4, the instruction boundary information corresponds to the end position of instruction 50*i*, and Tdemux (instruction demultiplexer) segments the instruction stream (i.e., instructions 500 to 50*n*) according to the instruction boundary information. Instruction 50*i* is adjacent to instruction 50*i*+1. When segmenting the instruction stream, the target instruction 50*i* is segmented into the previous instruction group (that is, instructions 500 to 50*i* belong to the previous instruction group after segmenting). Instruction 50*i*+1 is segmented into the next instruction group (that is, instructions 50*i*+1 to 50*n* belong to the next instruction group after segmenting), thereby achieving segmenting the instruction stream according to the segmentation position indicated by the instruction boundary information for instruction segmenting.

It should be noted that when multiple pieces of instruction boundary information are read, the instruction stream can also be segmented according to the above segmentation principle. For example, one instruction fetching request contains multiple pieces of instruction boundary information, and the multiple pieces of instructions boundary information indicate multiple positions for instruction segmentation, the embodiments of the present disclosure can perform multiple instruction stream segmentation operations on the instruction stream based on the multiple instruction segmentation positions indicated by the multiple pieces of instruction boundary information, and allocate the segmented multiple instruction groups to the corresponding target instruction queues in sequence.

In an optional implementation, allocating segmented instruction stream to multiple target instruction queues by using instruction at a segmentation position as boundary of switching instruction queues includes:

attaching a switching mark to the instruction at the segmentation position; and allocating the segmented instruction stream to the multiple target instruction queues based on the switching mark of the instruction at the segmentation position.

The switching mark in the embodiments of the present disclosure is located in the instruction at the segmentation position, and is used to indicate that the position at which the current instruction ends is the segmentation position. When the instruction at the segmentation position is attached with a switching mark, the instruction with the switching mark is allocated to the previous instruction queue, and the next instruction is allocated to an instruction queue different from that of the instruction with the switching mark.

Figure 5:
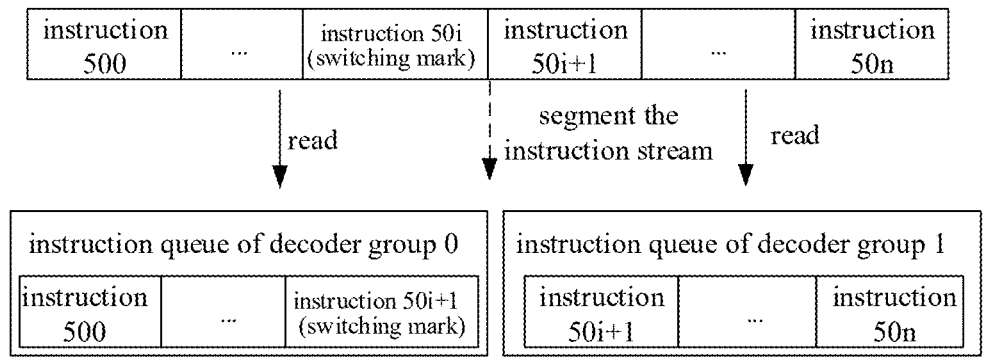
FIG. 5 is a schematic diagram of attaching a switching mark to an instruction at a segmentation position provided by the embodiments of the present disclosure.

FIG. 5 is a schematic diagram of attaching a switching mark to an instruction at a segmentation position provided by an embodiment of the present disclosure. As illustrated in FIG. 5, it is taken as an example for explanation that the instruction stream is from instruction 500 to instruction 50*n*. When the previous instruction group after segmentation is from instruction 500 to instruction 50*i*, and the next instruction group after segmentation is from instruction 50*i*+1 to instruction 50*n*, at this time, instruction 50*i* is the instruction at the segmentation position, and instruction 50*i* is attached with a switching mark. Further, in the process of segmenting the instruction stream, the instruction 50*i* can be used as the segmentation position, the segmented previous instruction group including instruction 500 to instruction 50*i* can be written into the instruction queue of decoder 0, and the segmented next instruction group including instruction 50*i*+1 to instruction 50*n* can be written into the instruction queue of decoder 1.

It should be noted that the switching mark can indicate the position where instruction segmentation is performed in the instruction stream. If one instruction fetching request is up to 64 bytes and the switching mark is 6 bits, it indicates which byte among the 64 bytes serves as the segmentation position to implement instruction segmentation.

In some embodiments, the switching mark may be transparently transmitted. The switching mark is used to indicate that the current instruction is the last instruction before switching, so that the last instruction in the instruction stream before segmenting is accompanied by a switching mark, so that the segmented instruction stream is allocated to multiple target instruction queues according to the switching mark. Because the switching mark can be transparently transmitted, for this reason, even if it is allocated to multiple instruction queues, the instructions at the segmentation position in the multiple instruction queues also carry the switching mark, and then after the decoder group decode the multiple instruction queues, in the decoded micro-op queue, the micro-op corresponding to the segmentation position also carries the switching mark. For this reason, in the subsequent process of reading the micro-op, the micro-ops can be read in different micro-op queues in a switching way according to the switching mark, thereby ensuring that the reading order of the micro-ops is the same as the order of the fetched instruction stream mentioned above.

Optionally, when the instruction is an instruction in the complex instruction set computer (CISC), the instruction stream corresponding to the CISC includes a switching mark, which can be read in the manner of reading the switching mark as described above, and is not described again here.

Further, after the segmentation is completed, the instruction at the segmentation position can be used as the boundary for switching instruction queues, and the segmented instruction stream can be allocated to multiple target instruction queues. The multiple target instruction queues are associated with threads of the simultaneously multi-threading processor. Optionally, the amount of threads in a simultaneously multi-threading processor may determine the amount of multiple target instruction queues. For example, when the simultaneously multi-threading processor is an SMT4 processor, the SMT4 processor has 4 threads, and there is one instruction queue corresponding to each thread. For this reason, the amount of instruction queues possessed by the SMT4 processor is 4. Under the SMT4 processor, the maximum number of target instruction queues is 4. Similarly, when the simultaneously multi-threading processor is an SMT2 processor, the SMT2 processor has 2 threads, and the amount of instruction queues possessed by SMT2 processor is 2. For this reason, under the SMT2 processor, the maximum number of target instruction queues is 2.

Multiple target instruction queues are used to store instruction streams to be decoded in corresponding decoder groups. The target instruction queue has a one-to-one correspondence with the instruction stream to be decoded. Therefore, the instruction stream can be alternately written into the target instruction queues supported by the simultaneously multi-threading processor. The amount of the instruction queues supported by the simultaneously multi-threading processor is equal to the amount of multiple target instruction queues; or the instruction stream can also be alternately written into the target instruction queue after merging the instruction queues supported by the simultaneously multi-threading processor, in this case, the amount of the target instruction queues is less than the amount of the instruction queues supported by the simultaneously multi-threading processor.

As an optional implementation, the target instruction queue can also be the remaining instruction queue of the simultaneously multi-threading processor after discarding some inactive instruction queues in the simultaneously multi-threading processor. In this case, the amount of target instruction queues is less than the amount of instruction queues supported by the simultaneously multi-threading processor.

For example, when the simultaneously multi-threading processor is an SMT4 processor, the amount of instruction queues corresponding to the threads in the SMT4 processor is 4. If the instruction stream is alternately written to the target instruction queue supported by the simultaneously multi-threading processor, the amount of multiple target instruction queues in this case is 4; if the instruction queue supported by the simultaneously multi-threading processor is merged in pairs, the instruction stream is alternately written into the target instruction queue after merging the instruction queues supported by the simultaneously multi-threading processor, in this case, the amount of the multiple target instruction queues is 2; if the instruction queues corresponding to two inactive threads in the simultaneously multi-threading processor are discarded, and the instruction stream is alternately written into the target instruction queues after merging the instruction queues supported by the simultaneously multi-threading processor, in this case, the amount of the multiple target instruction queues is 2.

In some embodiments, decoding instructions in the multiple target instruction queues by using multiple decoder groups to obtain micro-ops decoded by respective decoder groups includes:

decoding instructions in the multiple target instruction queues by using multiple decoder groups, so as to obtain micro-ops decoded by respective decoder groups, where the micro-op located at the segmentation position carries a switching mark.

One target instruction queue can be decoded by one decoder group to obtain micro-ops. During the decoding operation performed by the decoder group, the switching mark is not parsed and not compiled by the decoder group, and the decoded micro-op also carries the switching mark.

Figure 6:
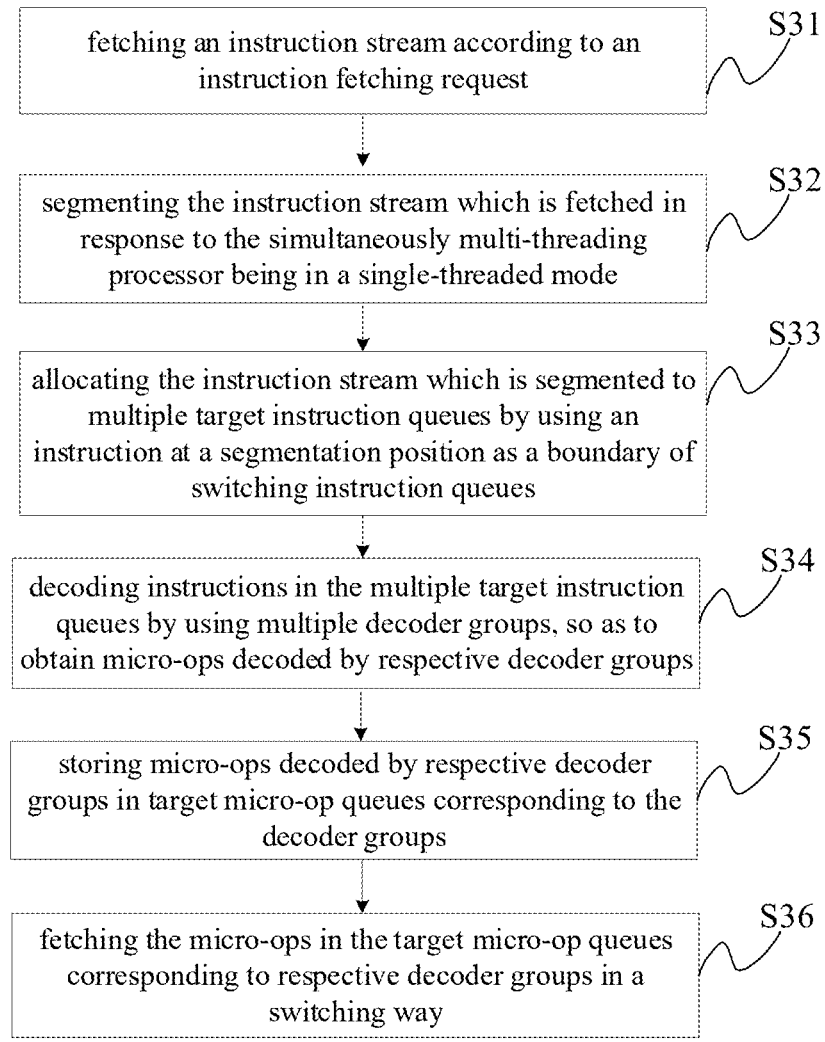
FIG. 6 is another schematic flowchart of a decoding method in the embodiments of the present disclosure.

In an optional embodiment, FIG. 6 is another flowchart of the decoding method in the embodiments of the present disclosure. As illustrated in FIG. 6, after step S34, it is also possible to perform following steps.

Step S35, storing micro-ops decoded by each decoder group in one or more target micro-op queues corresponding to the decoder group, where one decoder group corresponds to at least one target micro-op queue.

The target micro-op queue is used to store the micro-ops obtained from decoding instructions by the decoder group. For example, as illustrated in FIG. 2, for decoder group 0, its corresponding target micro-op queue T0" stores the micro-ops decoded by decoder group 0; for decoder group 1, its corresponding target micro-op queue T1" stores the micro-ops decoded by decoder group 1.

Step S36, reading micro-ops in the target micro-op queues corresponding to respective decoder groups in a switching way.

An optional implementation method for reading micro-ops in the target micro-op queues corresponding to respective decoder groups in the switching way may include: reading micro-ops in the target micro-op queues corresponding to respective decoder groups based on the micro-op carrying a switching mark stored in the target micro-op queue, where the switching mark of the micro-op is transparently transmitted through the instruction before decoding.

Furthermore, if the switching mark of the instruction is transparently transmitted to a decoded micro-op, for multiple micro-op queues corresponding to any one decoder group, when reading one micro-op queue, in case that a micro-op with the switching mark is read, a next micro-op queue is switched to for reading subsequent micro-ops, so that micro-ops are alternately read from multiple target micro-op queues corresponding to the decoder group.

Because the instruction stream is segmented in the single-threaded mode, it is possible to read micro-ops in the target micro-op queues corresponding to respective decoder, thereby ensuring that the read micro-ops are in the same order as the instructions in the initial instruction stream.

In the embodiments of the present disclosure, when the segmentation position carries a switching mark, because the switching mark can be transparently transmitted during the decoding process, once a switching mark exists in the instruction queue, the switching mark can flow along with the transform of the instruction queue. That is to say, for instructions carrying switching marks, when the instruction is allocated to the target instruction queue, the corresponding instruction in the target instruction queue also carries the switching mark. After the instructions in the target instruction queue are decoded, the decoded micro-op corresponding to the instruction carrying the switching mark also carries the switching mark.

In some embodiments, when the number of threads supported by a simultaneously multi-threading processor is greater than 2 (such as the SMT4 processor), in the single-threaded mode of the simultaneously multi-threading processor, due to the existence of one corresponding instruction queue and one micro instruction queue for each thread, the number of instruction queues and the number of micro-op queues in the simultaneously multi-threading are both greater than 2. In order to achieve effective utilization of queue resources in the simultaneously multi-threading processor, it is possible to merge threads that share one decoder group. That is to say, when the instruction queues in at least two sets of threads share one decoder group, the instruction queues in the at least two sets of threads can be merged, so that the merged target instruction queue has a greater depth. There are instruction queues and micro-op queues in different threads. Therefore, during the merging process, the instruction queues in at least two sets of threads can be merged to serve as the target instruction queue. The merging method of the target micro-op queue corresponds to the merging method of the target instruction queue, thereby providing greater depth for the decoding process of the instruction stream.

Of course, when the number of threads supported by a simultaneously multi-threading processor is greater than 2 (such as the SMT4 processor), in the single-threaded mode of the simultaneously multi-threading processor, due to the existence of one corresponding instruction queue and one micro-op queue for each thread, the number of instruction queues and the number of micro-op queues in the simultaneously multi-threading processor are both greater than 2. It is also possible to discard inactive threads that share one decoder group. That is to say, when the instruction queues in at least two threads share one decoder group, the instruction queue corresponding to the active thread in the shared decoder group is retained as the target instruction queue. When the instruction queue corresponding to the active thread is retained, the corresponding target micro-op queue is also retained. The instruction queues corresponding to inactive threads that share the decoder group are discarded, and when the instruction queues corresponding to inactive threads are discarded, the corresponding target micro-op queues are also discarded.

For example, the simultaneously multi-threading processor in the embodiments of the present disclosure can also be an SMT4 processor. The following will explain the situation of the target instruction queue where the SMT4 processor is in single-threaded mode.

Figure 7:
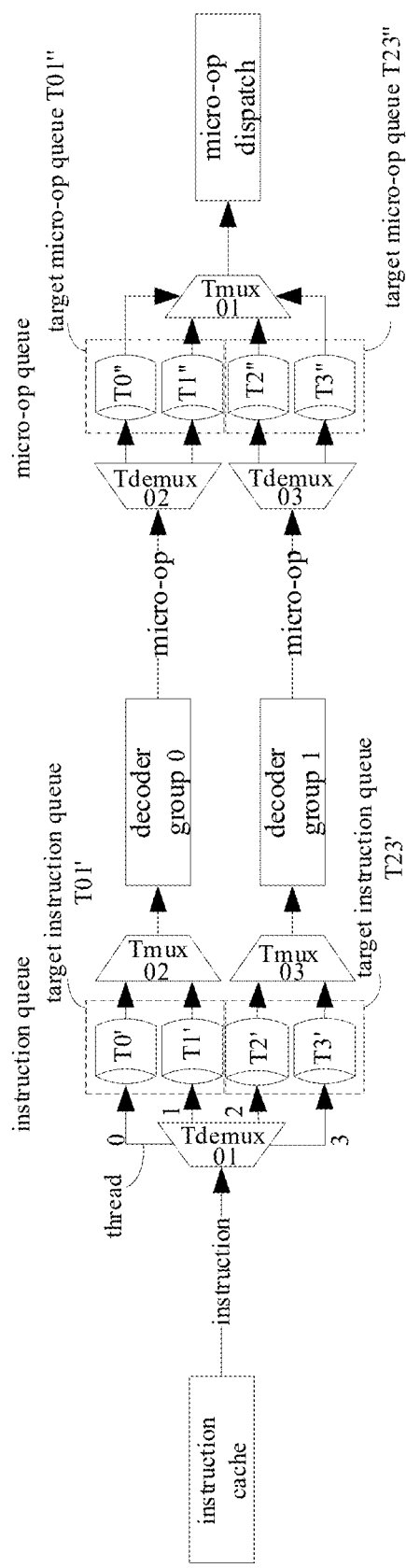
FIG. 7 is an architectural schematic diagram of a simultaneously multi-threading processor provided by the embodiments of the present disclosure.

FIG. 7 illustrates the architecture diagram of the SMT4 processor in the embodiments of the present disclosure, and it is taken as an example that the SMT4 processor is in the single-threaded mode.

It should be noted that when the SMT4 processor is in the single-threaded mode, actually, only one thread is in active state. However, in order to integrate processor resources as much as possible, the instruction queues corresponding to the same one decoder group in the SMT4 processor can be merged in pairs, so as to obtain the target instruction queue T01' and the target instruction queue T23', respectively. Thus, the target instruction queue T01' performs decoding by using the corresponding decoder group 0 to obtain the target micro-op queue T01", and the target instruction queue T23' performs decoding by using the corresponding decoder group 1 to obtain the target micro-op queue T23".

Furthermore, the target instruction queue T01' is the merger of the instruction queue T0' and the instruction queue T1', the target instruction queue T23' is the merger of the instruction queue T2' and the instruction queue T3', the target micro-op queue T01" is the merger of the micro-op queue T0" and the micro-op queue T1", and the target micro-op queue T23" is the merger of the micro-op queue T2" and the micro-op queue T3".

It can be understood that in the single-threaded mode of a simultaneously multi-threading processor, the merging of instruction queues can be performed based on the queue resource requirements of the simultaneously multi-threading processor. If there is no need to merge queue resources, the target instruction queue is the instruction queue corresponding to each thread, and the target micro-op queue is the micro-op queue corresponding to each thread. With decoder groups of a predetermined number as the premise, queue resources of the same number as the decoder groups are used, other queue resources can be idle. The embodiments of the present disclosure do not limit this.

By merging the above instruction queues, the merged target instruction queue T01' integrates data resources and has a greater data depth compared to instruction queue T0' or instruction queue T1'. Furthermore, by utilizing the decoder group corresponding to the target instruction queue for decoding, compared to using a single decoder group, multiple decoder groups can improve the throughput of the decoding process. Furthermore, in the process of parallel decoding of multiple decoder groups, out-of-order decoding can be achieved, which improves decoding efficiency. The implementation effect of the target instruction queue T23' compared to instruction queue T2' or instruction queue T3' can be referred to the aforementioned effect of target instruction queue T01' compared to instruction queue T0' or instruction queue T1', which is not repeated here.

Figure 8:
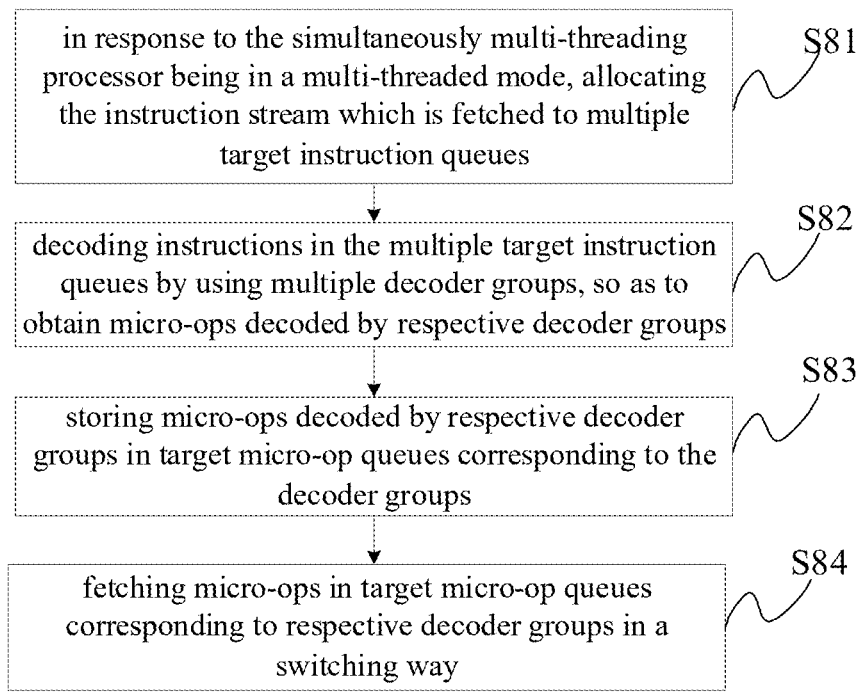
FIG. 8 is a flow chart of a decoding method in which a simultaneously multi-threading processor is in a multi-threaded mode in the embodiments of the present disclosure.

In an optional implementation, the simultaneously multi-threading processor can also be in multi-threaded mode. FIG. 8 is a decoding method flowchart of a simultaneously multi-threading processor in multi-threaded mode in the embodiments of the present disclosure. As illustrated in FIG. 8, the decoding steps include following steps.

Step S81, in response to the simultaneously multi-threading processor being in a multi-threaded mode, allocating fetched instruction stream to the multiple target instruction queues.

The multi-threaded mode can be a two-threaded mode or a four-threaded mode. Optionally, when the simultaneously multi-threading processor is a two-threaded processor, its corresponding multi-threaded mode includes only two-threaded mode; when the simultaneously multi-threading processor is a four-threaded processor, its corresponding multi-threaded mode can be either four-threaded mode or two-threaded mode.

In an embodiment, in the multi-threaded mode, instructions output from instruction cache are allocated to the target instruction queue corresponding to the thread ID of the instruction based on the thread ID. One thread ID corresponds to one target instruction queue, and there are multiple instructions with different thread IDs in the instruction stream.

The simultaneously multi-threading processor corresponds to multiple threads, and each thread has its corresponding thread ID. When the simultaneously multi-threading processor is in multi-threaded mode, multiple instructions can be allocated to the corresponding target instruction queue based on the thread ID.

Step S82, decoding instructions in the multiple target instruction queues by using multiple decoder groups, so as to obtain micro-ops decoded by respective decoder groups, where in the multi-threaded mode, one decoder group corresponds to at least one target instruction queue.

Because in the multi-threaded mode, one decoder group corresponds to at least one target instruction queue, multiple decoder groups can be used to parallel decode instructions in the multiple target instruction queues, thereby obtaining micro-ops decoded by the multiple decoder groups.

Step S83, storing micro-ops decoded by each decoder group in one or more target micro-op queues corresponding to the decoder group, where one decoder group corresponds to at least one target micro-op queue.

In an embodiment, the micro-op decoded by each decoder group is stored in the target micro-op queue corresponding to the decoder group according to the thread ID of the target instruction queue.

Because in the multi-threaded mode, respective decoder groups can decode the target instruction queues of different thread IDs, they can also store the decoded micro-ops into the target micro-op queue corresponding to the decoder group based on different thread IDs.

Step S84, reading micro-ops in target micro-op queues corresponding to respective decoder groups in a switching way.

In an embodiment, it is possible to read micro-ops in target micro-op queues corresponding to respective decoder groups in a switching way according to the thread IDs of the target micro-op queues.

Figure 9:
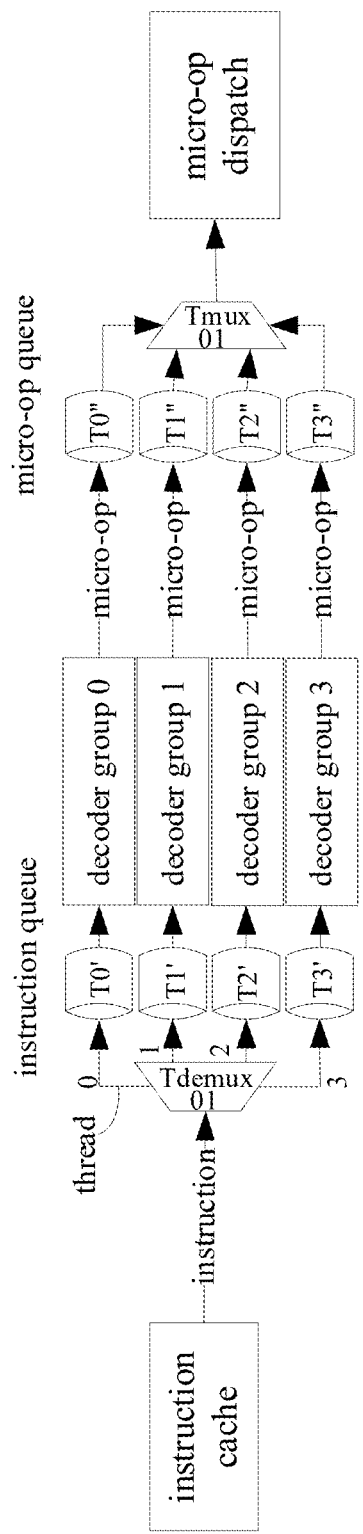
FIG. 9 is another architectural schematic diagram of a simultaneously multi-threading processor provided by the embodiments of the present disclosure.

In an optional implementation, FIG. 9 is another architecture diagram of the SMT4 processor in the embodiments of the present disclosure, and it is taken as an example for explanation that the SMT4 processor is in the multi-threaded mode. Assuming that the SMT4 processor includes four threads as illustrated in FIG. 9, namely; thread 0, thread 1, thread 2, and thread 3. Among them, thread 0 corresponds to instruction queue T0', decoder group 0, and micro-op queue T0"; thread 1 corresponds to instruction queue T1', decoder group 1, and micro-op queue T1": thread 2 corresponds to instruction queue T2', decoder group 2, and micro-op queue T2"; thread 3 corresponds to instruction queue T3', decoder group 3, and micro-op queue T3". The SMT4 processor is in the four-threaded mode, and instruction queues T0', T1', T2', and T3' can all be used as the target instruction queues. In this case, the number of the multiple target instruction queues is equal to the number of the threads in the simultaneously multi-threading processor.

In an embodiment, when the SMT4 processor is in the four-thread mode, after fetching the instruction stream from the instruction cache, the instruction stream is input into Tdemux01. Tdemux01 allocates the instructions in the instruction stream based on the thread ID and sequentially writes the instruction streams into the corresponding instruction queue T0', instruction queue T1', instruction queue T2', and instruction queue T3'. Optionally, if the thread ID in the instruction stream is 0, the instruction with the thread ID 0 is written into the instruction queue T0'. For other thread IDs, reference can be made to the description when the thread ID is 0, which will not be described again here.

Furthermore, after decoding by the decoder group, the micro-ops decoded by respective decoder groups are stored in the target micro-op queue corresponding to the decoder group according to the thread ID. That is to say, if the thread ID in the instruction stream is 0, then the micro-op decoded by decoder group 0 is written into the target micro-op queue T0". If the thread ID in the instruction stream is 1, then the micro-op decoded by decoder group 0 is written into the target micro-op queue T1". The method for writing into the target micro-op queue with other thread IDs can be referred to the description when the thread ID is 0, which will not be described again here.

At this time, when there are only two decoder groups, before storing the micro-ops decoded by each decoder group to the corresponding micro-op queue, a Tdemux02 or Tdemux03 can also be provided, as illustrated in FIG. 7, before writing into the micro-op queue, instructions with different thread IDs are written into different micro-op queues according to the thread IDs corresponding to the instructions in the micro-op stream.

Finally, before executing micro-op dispatch, Tmux01 can be used to read micro-ops from the target micro-op queues corresponding to respective decoder groups in a switching way according to the thread ID of the target micro-op queue, thereby ensuring that the sequence of the read micro-op stream is the same as that of the instruction stream fetched from the instruction cache.

Of course, in the embodiments of the present disclosure, the SMT4 processor can also be in a two-threaded mode. In this case, as illustrated in FIG. 9, it is assumed that thread 0 and thread 2 are active, and thread 1 and thread 3 are inactive. In this case, it is different from the four thread-thread mode that the instruction queue in thread 1 is merged with the instruction queue in thread 0, and the instruction queue in thread 3 is merged with the instruction queue in thread 2, so as to obtain the target instruction queue. In this case, the number of multiple target instruction queues is not greater than the number of threads in the four-thread processor. It can be seen that even when the SMT4 processor can still be in the two-thread mode, it can still utilize all the instruction queue resources on the four threads, which will not cause a waste of resources.

Further, in some other embodiments, the SMT4 processor is in the two-threaded mode, it is also taken as an example for explanation that thread 0 and thread 2 is active, and thread 1 and thread 3 is inactive. In this case, what is different from the aforementioned two-threaded mode is that, the instruction queue in thread 1 and the instruction queue in thread 3 can be discarded, only the instruction queue in thread 0 and the instruction queue in thread 2 are used, and the instruction queue in thread 0 and the instruction queue in thread 2 are determined as the target instruction queues. In this case, the number of the multiple target instruction queues is not greater than the number of threads of the four-threaded processor. In this case, compared to the aforementioned merging processing method, resources may be wasted.

However, whether the SMT4 processor is in the four-threaded mode or two-threaded mode, during the instruction decoding process, it can utilize multi-threaded queue resources and multiple decoders for parallel decoding, thereby ensuring that out-of-order decoding is achieved while guaranteeing the throughput during the decoding process of the processor group, and the order of the micro-ops in the read micro-op stream is the same as the order of the instruction stream fetched from the instruction cache.

When the simultaneously multi-threading processor in the embodiments of the present disclosure is in the single-threaded mode, multiple decoder groups are provided in the simultaneously multi-threading processor, and each decoder group corresponds to one or more instruction queues in the simultaneously multi-threading processor. During the instruction decoding process, multiple decoder groups in the simultaneously multi-threading processor are used for parallel decoding to ensure the throughput of the decoding process and improve the decoding efficiency of the simultaneously multi-threading processor. Further, in the embodiments of the present disclosure, because the instructions carry switching marks, for this reason, the simultaneously multi-threading processor supports out-of-order decoding of instructions in the single-threaded mode. During the out-of-order decoding process, the resources of multiple threads in the simultaneously multi-threading processor can also be merged (threads corresponding to instructions queue or micro-op queues), so as to effectively merge the resources of the simultaneously multi-threading processor while improving the decoding efficiency of the simultaneously multi-threading processor, and avoiding the waste of resources in the simultaneously multi-threading processor.

When the simultaneously multi-threading processor in the embodiments of the present disclosure is in the multi-threaded mode, multiple decoder groups are provided in the simultaneously multi-threading processor, and each decoder group corresponds to one or more instruction queues in the simultaneously multi-threading processor. During the instruction decoding process, multiple decoder groups in the simultaneously multi-threading processor are used for parallel decoding, thereby ensuring the throughput of the decoding process and improving the decoding efficiency of the simultaneously multi-threading processor. In the embodiments of the present disclosure, there is a switching mark in the instruction stream. For this reason, the simultaneously multi-threading processor can output the out-of-order decoded micro-ops according to the switching mark, so as to ensure that the order of micro-ops is consistent with that of the instruction stream from the instruction cache. Furthermore, during the out-of-order decoding process, the resources of multiple threads (the thread corresponds to the instruction queue or the micro-op queue) in the simultaneously multi-threading processor, so as to effectively merge the resources of the simultaneously multi-threading processor while improving the decoding efficiency of the simultaneously multi-threading processor, and avoiding the waste of resources in the simultaneously multi-threading processor.

The embodiments of the present disclosure also provide a simultaneously multi-threading processor, the structure of which can be referred to FIG. 7 or FIG. 9. The simultaneously multi-threading processor at least includes:
  an instruction cache, used for fetching an instruction stream according to an instruction fetching request;
  an instruction demultiplexer (Tdemux01), used for segmenting the fetched instruction stream in response to the simultaneously multi-threading processor being in a single-threaded mode, and allocating the segmented instruction stream to multiple target instruction queues by using an instruction at a segmentation position as a boundary of switching instruction queues, where the multiple target instruction queues comprise an instruction queue corresponding to an active thread and one or more instruction queues corresponding to one or more inactive threads; and
  multiple decoder groups (such as decoder group 0 and decoder group 1 in FIG. 7 or decoder group 0, decoder group 1, decoder group 2, and decoder group 3 in FIG. 9), used for decoding instructions in the multiple target instruction queues by using the multiple decoder groups, so as to obtain micro-ops decoded by respective decoder groups, where one decoder group decodes instruction in one or more corresponding target instruction queues, and in the single-threaded mode, one decoder group corresponds to at least one target instruction queue.

Optionally, the number of the multiple target instruction queues is less than or equal to the number of instruction queues in the simultaneously multi-threading processor.

Optionally, the instruction demultiplexer (Tdemux01) is also used for, in response to the simultaneously multi-threading processor being in a multi-threaded mode, allocating the fetched instruction stream to multiple target instruction queues corresponding to multiple threads. The number of the multiple threads corresponds to the multiple target instruction queues.

Optionally, the instruction demultiplexer is also used for, in response to the simultaneously multi-threading processor being in a multi-threaded mode, allocating the fetched instruction stream to multiple target instruction queues corresponding to multiple threads, which includes:
  in the multi-threaded mode, allocating an instruction to a target instruction queue corresponding to a thread ID of the instruction based on the thread ID of each instruction in the instruction stream output by an instruction cache, where one thread ID corresponds to one target instruction queue, and multiple instructions with different thread IDs are present in the instruction stream.

In an optional implementation of the embodiments of the present disclosure, the processor further includes: an instruction multiplexer (Tmux02 or Tmux03), which is used for transferring instructions in one or more target instruction queues to a corresponding decoder group, so as to decode the instructions by using the decoder group.

Further, in the embodiments of the present disclosure, the processor further includes:
  a micro-op demultiplexer (Tdemux02 or Tdemux03), which is used for storing the micro-ops decoded by respective decoder groups in target micro-op queues corresponding to the decoder groups, where one decoder group corresponds to at least one target micro-op queue; and
  a micro-op multiplexer Tmux01, which is used for reading the micro-ops in the target micro-op queues corresponding to respective decoder groups in a switching way.

Optionally, the micro-op multiplexer, in the single-threaded mode, is used for reading the micro-ops in the target micro-op queues corresponding to respective decoder groups in the switching way, which includes:
  reading the micro-ops in the target micro-op queues corresponding to respective decoder groups in the switching way based on a micro-op carrying a switching mark stored in the target micro-op queue, where in case that an instruction carries the switching mark, the switching mark of the instruction is transparently transmitted to a decoded micro-op.

Optionally, the micro-op multiplexer, in the single-threaded mode, is used for reading the micro-ops in the target micro-op queues corresponding to respective decoder groups in the switching way based on a micro-op carrying a switching mark stored in the target micro-op queue, which includes:

for multiple micro-op queues corresponding to any one decoder group, when reading one micro-op queue, in case that a micro-op with the switching mark is read, switching to a next micro-op queue to read subsequent micro-ops, so that micro-ops are alternately read from multiple target micro-op queues corresponding to the decoder group.

Optionally, the instruction demultiplexer is used for, in response to the simultaneously multi-threading processor being in a multi-threaded mode, allocating the fetched instruction stream to multiple target instruction queues corresponding to multiple threads, which includes:

in the multi-threaded mode, allocating an instruction to a target instruction queue corresponding to a thread ID of the instruction based on the thread ID of each instruction in the instruction stream output by the instruction cache, where one thread ID corresponds to one target instruction queue, and multiple instructions with different thread IDs are present in the instruction stream.

Optionally, the micro-op demultiplexer in the present disclosure is used for storing micro-ops decoded by respective decoder groups in target micro-op queues corresponding to the decoder groups. One decoder group corresponds to at least one target micro-op queue.

The micro-op multiplexer is used for reading micro-ops in target micro-op queues corresponding to respective decoder groups in a switching way.

Optionally, the micro-op demultiplexer, in the multi-threaded mode, is used for storing micro-ops decoded by respective decoder groups in target micro-op queues corresponding to the decoder groups, which includes:

storing micro-ops decoded by respective decoder groups in target micro-op queues corresponding to the decoder groups according to thread IDs of the target micro-op queues.

The micro-op multiplexer is used for reading micro-ops in target micro-op queues corresponding to respective decoder groups in the switching way, which includes:

reading micro-ops in target micro-op queues corresponding to respective decoder groups in the switching way according to the thread IDs of the target micro-op queues.

In an embodiment, the simultaneously multi-threading processor at least comprises a four-threaded processor or a two-threaded processor.

When the four-threaded processor is in a four-threaded mode or the two-threaded processor is in a two-threaded mode, the number of the multiple instruction queues is equal to the number of threads in the simultaneously multi-threading processor.

Optionally, when the four-threaded processor is in the two-threaded mode, the number of the multiple instruction queues is not greater than the number of threads in the four-threaded processor. The multiple instruction queues are obtained by merging instruction queues of the four-threaded processor corresponding to the same one decoder group in pairs, or by discarding instruction queues corresponding to inactive threads.

When the simultaneously multi-threading processor in the embodiments of the present disclosure is in the single-threaded mode, multiple decoder groups are provided in the simultaneously multi-threading processor, and each decoder group corresponds to one or more instruction queues in the simultaneously multi-threading processor. During the instruction decoding process, multiple decoder groups in the simultaneously multi-threading processor are used for parallel decoding to ensure the throughput of the decoding process and improve the decoding efficiency of the simultaneously multi-threading processor. Further, in this disclosure, because the instruction carries a switching mark, for this reason, the simultaneously multi-threading processor supports out-of-order decoding of instructions in the single-threaded mode. During the out-of-order decoding process, resources of multiple threads (thread corresponds to instruction queue or micro-op queue) in the simultaneously multi-threading processor can also be merged, so as to effectively merge the resources of the simultaneously multi-threading processor while improving the decoding efficiency of the simultaneously multi-threading processor, and avoiding the waste of resources in the simultaneously multi-threading processor.

When the simultaneously multi-threading processor in the embodiments of the present disclosure is in the multi-threaded mode, multiple decoder groups are provided in the simultaneously multi-threading processor, and each decoder group corresponds to one or more instruction queues in the simultaneously multi-threading processor. During the instruction decoding process, multiple decoder groups in the simultaneously multi-threading processor are used for parallel decoding, thereby ensuring the throughput of the decoding process and improving the decoding efficiency of the simultaneously multi-threading processor. In the embodiments of the present disclosure, there is a switching mark in the instruction stream, for this reason, the simultaneously multi-threading processor can output the out-of-order decoded micro-ops according to the switching mark to ensure that the order of the micro-ops is consistent with the order of the instruction stream from the instruction cache. Furthermore, during the out-of-order decoding process, the resources of multiple threads (the thread corresponds to the instruction queue or the micro-op queue) in the simultaneously multi-threading processor can also be merged, so as to effectively merge the resources of the simultaneously multi-threading processor while improving the decoding efficiency of the simultaneously multi-threading processor, and avoiding the waste of resources in the simultaneously multi-threading processor.

The embodiments of the present disclosure also provide a chip, which may include the above-mentioned processor.

The embodiments of the present disclosure also provide an electronic device, such as a server device or a terminal device, which may include the above chip.

The above describes multiple embodiment solutions provided by the embodiments of the present disclosure. The optional methods introduced in respective embodiment solutions can be combined and cross-referenced with each other without conflict, thereby extending a variety of possible embodiment solutions. These can be considered as disclosed embodiments of the present disclosure.

Although the embodiments of the present disclosure are disclosed above, the present disclosure is not limited thereto. Any person skilled in the art can make various changes and modifications without departing from the spirit and scope of the present disclosure. Therefore, the protection scope of the present disclosure should be subject to the scope defined by the claims.

The invention claimed is:

1. A decoding method of a simultaneously multi-threading processor, comprising:

fetching an instruction stream according to an instruction fetching request;
segmenting the instruction stream which is fetched in response to the simultaneously multi-threading processor being in a single-threaded mode;
allocating the instruction stream which is segmented to multiple target instruction queues by using an instruction at a segmentation position as a boundary of switching instruction queues, wherein the multiple target instruction queues comprise an instruction queue corresponding to an active thread and one or more instruction queues corresponding to one or more inactive threads; and
decoding instructions in the multiple target instruction queues by using multiple decoder groups, so as to obtain micro-ops decoded by respective decoder groups, wherein one decoder group decodes instructions in one or more corresponding target instruction queues, and in the single-threaded mode, one decoder group corresponds to at least one target instruction queue.

2. The method according to claim 1, wherein an amount of the multiple target instruction queues is less than or equal to an amount of instruction queues processed by the simultaneously multi-threading processor.

3. The method according to claim 1, wherein segmenting the instruction stream which is segmented comprises:
segmenting the instruction stream according to the segmentation position indicated by instruction boundary information for instruction segmenting, wherein the instruction boundary information is carried in the instruction fetching request.

4. The method according to claim 3, wherein allocating the instruction stream which is segmented to the multiple target instruction queues by using the instruction at the segmentation position as the boundary of switching the instruction queues comprises:
attaching a switching mark to the instruction at the segmentation position; and
allocating the instruction stream which is segmented to the multiple target instruction queues based on the switching mark of the instruction at the segmentation position.

5. The method according to claim 4, further comprising:
storing the micro-ops decoded by respective decoder groups in target micro-op queues corresponding to the decoder groups, wherein one decoder group corresponds to at least one target micro-op queue; and
fetching the micro-ops in the target micro-op queues corresponding to respective decoder groups in a switching way.

6. The method according to claim 5, wherein fetching the micro-ops in the target micro-op queues corresponding to respective decoder groups in the switching way comprises:
fetching the micro-ops in multiple target micro-op queues corresponding to the decoder groups in the switching way based on the micro-ops carrying switching marks stored in the target micro-op queues, wherein, in a case that an instruction carries the switching mark, the switching mark of the instruction is transparently transmitted to a decoded micro-op.

7. The method according to claim 6, wherein fetching the micro-ops in the multiple target micro-op queues corresponding to the decoder groups in the switching way based on the micro-ops carrying the switching marks stored in the target micro-op queues comprises:
for the multiple micro-op queues corresponding to any one decoder group, when fetching one micro-op queue, in a case that a micro-op carrying with the switching mark is fetched, switching to a next micro-op queue to fetch subsequent micro-ops, so that the micro-ops are alternately fetched from the multiple target micro-op queues corresponding to the decoder groups.

8. The method according to claim 1, further comprising:
in response to the simultaneously multi-threading processor being in a multi-threaded mode, allocating the instruction stream which is fetched to the multiple target instruction queues corresponding to multiple threads, wherein an amount of the multiple threads corresponds to the multiple target instruction queues; and
decoding the instructions in the multiple target instruction queues by using the multiple decoder groups, so as to obtain the micro-ops decoded by respective decoder groups, wherein, in the multi-threaded mode, one decoder group corresponds to at least one target instruction queue.

9. The method according to claim 8, wherein, in response to the simultaneously multi-threading processor being in the multi-threaded mode, allocating the instruction stream which is fetched to the multiple target instruction queues corresponding to the multiple threads comprises:
in the multi-threaded mode, allocating an instruction to a target instruction queue corresponding to a thread ID of the instruction based on the thread ID of each instruction in the instruction stream output by an instruction cache, wherein one thread ID corresponds to one target instruction queue, and multiple instructions with different thread IDs are present in the instruction stream.

10. The method according to claim 8, further comprising:
storing the micro-ops decoded by respective decoder groups in target micro-op queues corresponding to the decoder groups, wherein one decoder group corresponds to at least one target micro-op queue; and
fetching the micro-ops in the target micro-op queues corresponding to respective decoder groups in a switching way.

11. The method according to claim 10, wherein storing the micro-ops decoded by respective decoder groups in the target micro-op queues corresponding to the decoder groups comprises:
storing the micro-ops decoded by respective decoder groups in the target micro-op queues corresponding to the decoder groups according to thread IDs of the target instruction queues;
fetching the micro-ops in the target micro-op queues corresponding to respective decoder groups in the switching way comprises:
fetching the micro-ops in the target micro-op queues corresponding to respective decoder groups in the switching way according to thread IDs of the target micro-op queues.

12. The method according to claim 8, wherein the simultaneously multi-threading processor at least comprises a four-threaded processor and a two-threaded processor; and
when the four-threaded processor is in a four-threaded mode or the two-threaded processor is in a two-threaded mode, an amount of the multiple target instruction queues is equal to an amount of threads in the simultaneously multi-threading processor.

13. The method according to claim 12, wherein when the four-threaded processor is in the two-threaded mode, the amount of the multiple target instruction queues is not greater than the amount of the threads processed by the four-threaded processor,
  wherein the multiple target instruction queues are obtained by merging instruction queues of the four-threaded processor corresponding to a same one decoder group in pairs, or by discarding instruction queues corresponding to inactive threads.

14. A simultaneously multi-threading processor, comprising:
  an instruction cache, used for fetching an instruction stream according to an instruction fetching request;
  an instruction demultiplexer, used for segmenting the instruction stream which is fetched in response to the simultaneously multi-threading processor being in a single-threaded mode, and allocating the instruction stream which is segmented to multiple target instruction queues by using an instruction at a segmentation position as a boundary of switching instruction queues, wherein the multiple target instruction queues comprise an instruction queue corresponding to an active thread and one or more instruction queues corresponding to one or more inactive threads; and
  multiple decoder groups, used for decoding instructions in the multiple target instruction queues by using the multiple decoder groups, so as to obtain micro-ops decoded by respective decoder groups, wherein one decoder group decodes instructions in one or more corresponding target instruction queues, and in the single-threaded mode, one decoder group corresponds to at least one target instruction queue.

15. The simultaneously multi-threading processor according to claim 14, wherein the instruction demultiplexer is further used for, in response to the simultaneously multi-threading processor being in a multi-threaded mode, allocating the instruction stream which is fetched to the multiple target instruction queues corresponding to multiple threads, wherein an amount of the multiple threads corresponds to the multiple target instruction queues.

16. The simultaneously multi-threading processor according to claim 15, wherein the instruction demultiplexer being used for, in response to the simultaneously multi-threading processor being in the multi-threaded mode, allocating the instruction stream which is fetched to the multiple target instruction queues corresponding to the multiple threads, comprises:
  in the multi-threaded mode, allocating an instruction to a target instruction queue corresponding to a thread ID of the instruction based on the thread ID of each instruction in the instruction stream output by an instruction cache, wherein one thread ID corresponds to one target instruction queue, and multiple instructions with different thread IDs are present in the instruction stream.

17. The simultaneously multi-threading processor according to claim 15, further comprising:
  an instruction multiplexer, used for transferring instructions in one or more target instruction queues to a corresponding decoder group, so as to decode the instructions by using the decoder group.

18. The simultaneously multi-threading processor according to claim 17, further comprising:
  a micro-op demultiplexer, used for storing the micro-ops decoded by respective decoder groups in target micro-op queues corresponding to the decoder groups, wherein one decoder group corresponds to at least one target micro-op queue; and
  a micro-op multiplexer, used for fetching the micro-ops in the target micro-op queues corresponding to respective decoder groups in a switching way.

19. The simultaneously multi-threading processor according to claim 18, wherein the micro-op multiplexer being used for fetching the micro-ops in the target micro-op queues corresponding to respective decoder groups in the switching way comprises:
  in the single-threaded mode, fetching the micro-ops in multiple target micro-op queues corresponding to the decoder groups in the switching way based on the micro-ops carrying switching marks stored in the target micro-op queues, wherein, in a case that an instruction carries a switching mark, the switching mark of the instruction is transparently transmitted to a decoded micro-op; and
  in the multi-threaded mode, fetching the micro-ops in the target micro-op queues corresponding to respective decoder groups in the switching way according to thread IDs of the target micro-op queues.

20. A chip, comprising a processor,
wherein the processor comprises:
an instruction cache, used for fetching an instruction stream according to an instruction fetching request;
an instruction demultiplexer, used for segmenting the instruction stream which is fetched in response to the simultaneously multi-threading processor being in a single-threaded mode, and allocating the instruction stream which is segmented to multiple target instruction queues by using an instruction at a segmentation position as a boundary of switching instruction queues, wherein the multiple target instruction queues comprise an instruction queue corresponding to an active thread and one or more instruction queues corresponding to one or more inactive threads; and
multiple decoder groups, used for decoding instructions in the multiple target instruction queues by using the multiple decoder groups, so as to obtain micro-ops decoded by respective decoder groups, wherein one decoder group decodes instructions in one or more corresponding target instruction queues, and in the single-threaded mode, one decoder group corresponds to at least one target instruction queue.

* * * * *